US008984230B2

(12) United States Patent
Kocberber et al.

(10) Patent No.: US 8,984,230 B2
(45) Date of Patent: Mar. 17, 2015

(54) METHOD OF USING A BUFFER WITHIN AN INDEXING ACCELERATOR DURING PERIODS OF INACTIVITY

(71) Applicant: Hewlett-Packard Development Company, L.P., Houston, TX (US)

(72) Inventors: Onur Kocberber, Lausanne (CH); Kevin T. Lim, La Honda, CA (US); Parthasarathy Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 239 days.

(21) Appl. No.: 13/754,758

(22) Filed: Jan. 30, 2013

(65) Prior Publication Data

US 2014/0215160 A1 Jul. 31, 2014

(51) Int. Cl.
*G06F 12/08* (2006.01)
(52) U.S. Cl.
CPC .................................. *G06F 12/0891* (2013.01)
USPC ......................................................... 711/134
(58) Field of Classification Search
None
See application file for complete search history.

(56) References Cited

U.S. PATENT DOCUMENTS

| 7,996,621 | B2 | 8/2011 | Brown et al. | |
|---|---|---|---|---|
| 2003/0226050 | A1* | 12/2003 | Yik et al. | 713/324 |
| 2008/0192050 | A1* | 8/2008 | Schardt et al. | 345/421 |
| 2009/0183167 | A1 | 7/2009 | Kupferschmidt et al. | |
| 2009/0327780 | A1* | 12/2009 | Dawkins et al. | 713/323 |
| 2013/0113790 | A1* | 5/2013 | Kazakov | 345/419 |

OTHER PUBLICATIONS

Li, B. et al.; "Exploiting a Computation Reuse Cache to Reduce Energy in Network Processors"; Nov. 2005; http://www.cs.ucr.edu/~gupta/research/Publications/Comp/hipeac05.pdf.

* cited by examiner

*Primary Examiner* — Kevin Verbrugge
(74) *Attorney, Agent, or Firm* — Van Cott, Bagley, Cornwall & McCarthy (57) ABSTRACT

A method of using a buffer within an indexing accelerator during periods of inactivity, comprising flushing indexing specific data located in the buffer, disabling a controller within the indexing accelerator, handing control of the buffer over to a higher level cache, and selecting one of a number of operation modes of the buffer. An indexing accelerator, comprising a controller and a buffer communicatively coupled to the controller, in which, during periods of inactivity, the controller is disabled and a buffer operating mode among a number of operating modes is chosen under which the buffer will be used.

15 Claims, 6 Drawing Sheets

METHOD OF USING A BUFFER WITHIN AN INDEXING ACCELERATOR DURING PERIODS OF INACTIVITY

BACKGROUND

A system on chip (SoC) is an integrated circuit (IC) that combines a number of components of a computer or other electronic system into a single chip. One component added to a SoC may include an indexing accelerator that accelerates the indexing processes associated with databases. The indexing accelerator, sometimes called a "widget," may provide acceleration of the instructions executed by a processor for indexing. In addition, a small cache data structure may be included to buffer indexing data within the widget.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

As described above, a system on chip (SoC) may include an indexing accelerator or other fixed functionality block called a widget which provides for, in the case of an indexing accelerator, the acceleration of instructions executed during an indexing procedure. However, there are times when the widgets are not engaged in the indexing functions or other functionalities. These temporary moments of inactivity result in hardware within the widget not being used to its maximum potential. It has been shown that for a standard online transaction processing (i.e., Transaction Processing Performance Council-Type C transactions) benchmark, at most 36% of the time is spent in indexing operations. Similarly, it has been shown that for a standard decision support system (i.e., Transaction Processing Council Ad-hoc/decision) benchmark, at most 73% of the time is spent by the indexing accelerator in its indexing operations.

The components used with the indexing accelerator are therefore not used for any other purpose than to provide acceleration of the instructions executed by a processor for indexing. Specifically, in the case of an indexing accelerator, there is a relatively small amount of buffer memory. During operation of the widget, the buffer would be available to temporarily store an amount of data which is being indexed, for example, by the widget.

The present specification, therefore describes a method of using a buffer within an indexing accelerator during periods of inactivity, comprising flushing indexing specific data located in the buffer, disabling a controller within the indexing accelerator, handing control of the buffer over to a higher level cache, and selecting one of a number of operation modes of the buffer. The present specification, further describes an indexing accelerator, comprising a controller and a buffer communicatively coupled to the controller, in which, during periods of inactivity, the controller is disabled and a buffer operating mode among a number of operating modes is chosen under which the buffer will be used. Still further, the present specification describes a computer program product for using a buffer within an indexing accelerator during periods of inactivity, the computer program product comprising a computer readable storage medium comprising computer usable program code embodied therewith, the computer usable program code to, when executed by a processor, flush indexing specific data located in the buffer, disable a controller within the indexing accelerator, hand over control of the buffer to a higher level cache, and select one of a number of operation modes of the buffer.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the present specification and in the appended claims, the term "fixed functionality block" is meant to be understood broadly as any single component included on a system-on-chip (SoC) integrated circuit that provides for any one specific task. A number of examples exist including an indexing accelerator, a packet decoder, data decrypter, among others. Throughout the description and the appended claims, the term "widget" may alternatively be used to denote a fixed-functionality block generally.

Figure 1:
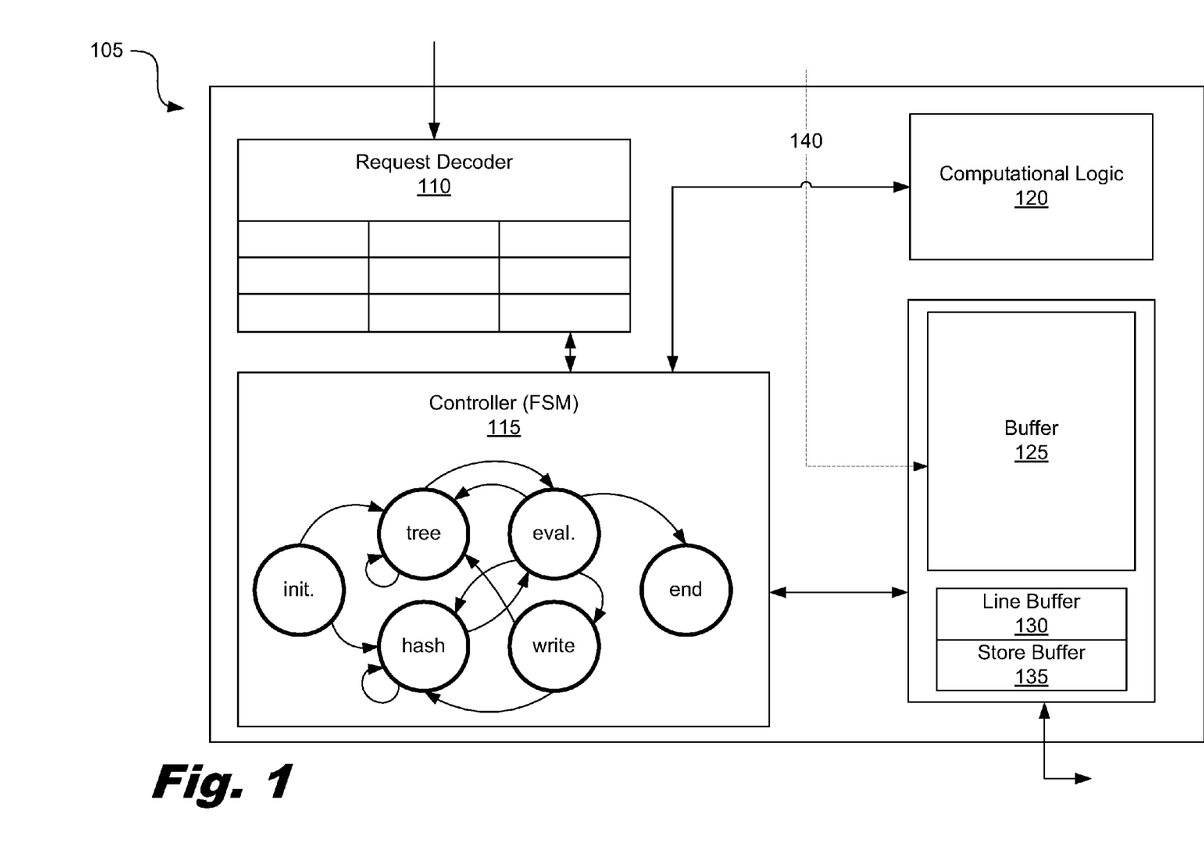
FIG. 1 is a block diagram of the architecture of an indexing accelerator according to one example of the principles described herein.

Turning now to FIG. 1, a block diagram of the architecture of a specific type of fixed-functionality block called an indexing accelerator (105) is shown according to one example of the principles described herein. As described above, the indexing accelerator (105) may be one of many types of fixed functionality blocks that may be used as a component on a system-on-chip integrated circuit. For convenience in explanation, however, the present description will include an indexing accelerator (105) as an example of a fixed functionality block. Other types of fixed functionality blocks may be used, however, and the present specification contemplates these other examples.

The indexing accelerator (105) may include a number of components which allow it to operate, at least temporarily, as an indexing accelerator. Therefore, the indexing accelerator (105) comprises a request decoder (110), a controller (115) (i.e., a finite state machine), computational logic (120), and a buffer (125) including a line buffer (130) and a store buffer (135). Each of these will now be described briefly.

The request decoder (110) may receive a number of requests from a central processing unit or a higher level cache. These requests, in the case of the indexing accelerator (105), are offloaded database indexing requests and the request decoder (110) may decode these requests as they are received by the indexing accelerator (105).

The controller (115) may handle lookups into the index data structure (i.e., a red-black tree, a B-tree, or a hash table), perform any computation generally engaged in while indexing (such as joining between two tables or matching specific fields), and access the data being searched for (such as the database records that match the user's query).

In one example, the buffer may be a small (i.e., 4-8 KB) fully associative cache that stores any data that is touched during the indexing accelerator's (105) execution. This may be done to leverage spatial and temporal locality. The indexing accelerator (105) interface is provided as a computer usable program code library. This may provide functions such as index creation and lookup. These library calls are converted to specific instruction set architecture (ISA) extension instructions to setup and use the indexing accelerator (105). During the indexing accelerator (105) invocations, a processing core executing the thread that is indexing may sleep while the indexing accelerator (105) is performing the indexing operation. Once the indexing is complete, the indexing accelerator (105) pushes the found data (i.e., in the form of a temporary table) to the processor's cache, and sends the core an interrupt, enabling the core to continue execution.

During those times when the indexing accelerator (105) is not being used to index data, the components of the indexing accelerator (105) may be used for other purposes to augment a processor's existing cache hierarchy. Using the indexing accelerator (105) during idle periods may reduce wasted transistors, improve a processor's performance by providing expanded cache capacity, improve a processor's energy consumption by allowing portions of the cache to be shut down, and reduce periods of poor processor utilization by providing a higher level of optimizations.

Therefore, during these idle periods the controller (115), request decoder (110), and computational logic (120) may be shutdown and a processor or higher level cache may be given access to the buffer (125) of the indexing accelerator (105). In one example, the controller (115), request decoder (110), and computational logic (120) may individually or in combination provide access to the buffer (125) by the core processor. In another example, the indexing accelerator (105) may provide an internal connector (140) directly connecting the buffer (125) of the indexing accelerator (105) to the core.

During the idle times of the indexing accelerator (105), a processing core or higher level cache may use the buffer (125) as a victim cache, a miss buffer, a stream buffer, or an optimization buffer. The use of the buffer (125) for these different types of caches will now be described in connection with FIG. 2.

Figure 2:
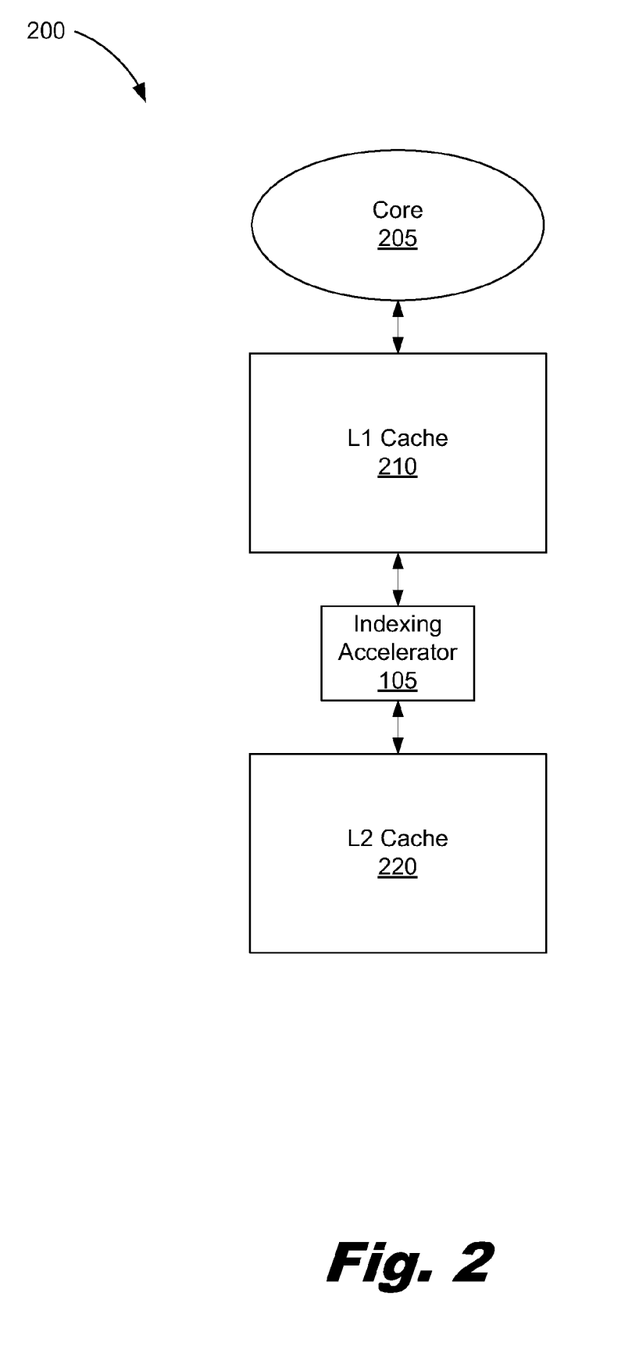
FIG. 2 is a block diagram of a memory hierarchy augmented by the indexing accelerator of FIG. 1 according to one example of the principles described herein.

FIG. 2 is a block diagram of a memory hierarchy (200) augmented by the indexing accelerator (FIG. 1, 105) of FIG. 1 according to one example of the principles described herein. In the example shown in FIG. 2, the memory hierarchy (200) comprises a processing core (205), a level 1 (L1) cache (210), an indexing accelerator (105) as described in FIG. 1, and an L2 cache (220). Although, FIG. 1 shows that the memory hierarchy (200) includes an indexing accelerator (105) communicatively coupled between the level 1 (L1) 83140954 cache (210) and L2 cache (220), various other configurations may exist. As such, the present specification contemplates the use of the indexing accelerator (105) in any configuration that would suit any particular processing scenario. The present specification further contemplates that the indexing accelerator (105) may reside anywhere on the SOC. Therefore, FIG. 2 is meant to be an example and is not meant to limit the scope of the present example, and instead will be used as an example while explaining the principles described herein.

During operation of the indexing accelerator (105), a processor core (205) may send a signal to the indexing accelerator (105) indicating, via execution of computer program code (i.e., ISA instructions), that the indexing accelerator (105) is to index a certain location or search for specific data. After these various tasks have been accomplished by the indexing accelerator (105), the indexing accelerator (105) sends an interrupt signal to the processor core (205) signifying that the tasks are complete and the indexing accelerator (105) is now available for other tasks.

Having received this information, the processor core (205) then directs the indexing accelerator (105) to flush any stale indexing accelerator (105) specific data in the buffer (FIG. 1, 125). Because the buffer (FIG. 1, 125) was previously used to cache data that the indexing accelerator (105) was using during its indexing operations, this clean data (i.e., tree nodes within an index, data table tuple entries, among others) is flushed out so that that data will not be accidentally accessed while the indexing accelerator (105) is not being used as an indexing accelerator (105). In any example where "dirty" or modified data remains in the buffer (FIG. 1, 125), the buffer (FIG. 1, 125) may enable snooping by any lower caches such that those lower caches (i.e., L2 Cache (220)) see that modified data and write back that modified data.

After the data has been flushed from the buffer (FIG. 1, 125), then the controller (FIG. 1, 115) is disabled. Disabling the controller (FIG. 1, 115) prevents the indexing accelerator (105) from acting as an indexing accelerator and instead allows certain components of the indexing accelerator (105) to be used for the various different purposes as described below. In some examples, the indexing accelerator (105), after disablement of the controller (FIG. 1, 115), may be used as a victim cache. In other examples, the indexing accelerator (105), after disablement of the controller (FIG. 1, 115), may be used as a miss buffer. In still other examples, the indexing accelerator (105), after disablement of the controller (FIG. 1, 115), may be used as a stream buffer. In yet other examples, the indexing accelerator (105), after disablement of the controller (FIG. 1, 115), may be used as an optimization buffer. These four types of operating modes will be discussed in more detail below.

In one example, the processing core (205) may send a signal to the indexing accelerator (105) to disable the controller (FIG. 1, 115). This may allow the processing core (205) to control, from a central location or component, whether the indexing accelerator (105) is used as an indexing accelerator or as one of a victim cache, a miss buffer, a stream prefetch buffer, or an optimization buffer. In another example, a separate component in the memory hierarchy (200) may disable the controller (FIG. 1, 115).

After the controller (FIG. 1, 115) has been disabled, the control over the buffer (FIG. 1, 125) is handed over to a higher level cache such as the L1 cache (210) in FIG. 2 or, in other examples, a higher level cache or processing core. In the example shown in FIG. 2, the L1 cache (210) may use the buffer (FIG. 1, 125) for any one of the buffer modes described above (i.e., victim cache, a miss buffer, a stream prefetch buffer, or an optimization buffer). Each of these modes will now be described in more detail.

In one example, the L1 cache (210) may use the buffer (FIG. 1, 125) in a victim cache mode as a victim cache. A victim cache may be a cache that holds lines that have been evicted from a previously level of cache. The L1 cache (210) may be a relatively smaller cache than, for example, the L2 cache (220). The L1 cache (210) is relatively small so as to provide relatively faster access to cached data. However, as a result, the buffer (FIG. 1, 125) may serve as a location where evicted data blocks from the L1 cache (210) are held upon replacement of those blocks in the L1 cache (210). The use of the indexing accelerator's (105) buffer (FIG. 1, 125) as a victim cache allows for a buffer that has relatively low cache hit latencies while still providing a buffer for those data blocks that have been evicted due to limited capacity in the L1 cache (210). This gives the memory hierarchy (200) an extra level of associativity for the cache and improves performance of the memory hierarchy (200) in general.

In another example, the L1 cache (210) may use the buffer (FIG. 1, 125) in a miss cache mode as a miss cache. A miss cache provides for situations arising in the memory hierarchy (200) where there has been a failed attempt to read or write a piece of data in the L1 cache (210). In this example, the miss is issued to the lower levels of cache and the buffer (FIG. 1, 125) in a miss cache mode may provide the L1 cache (210) with those data blocks without brining them into the L1 cache (210). This allows for the data blocks to remain in a lower level cache while preventing the disadvantageous efforts (i.e., cache pollution) of attempting to bring those data blocks into the L1 cache (210). As a result, this may allow the memory hierarchy (200) to filter out those data accesses that may occur relatively less frequently than other accesses. In situations where the miss data blocks are accessed a threshold number of times, then they may be elevated to the L1 cache (210) for quicker access by the processor. In this example, the miss buffer (FIG. 1, 125) may be responsible for counting how often that miss data blocks are accessed and determining if and when that threshold is met.

In yet another example, the L1 cache (210) may use the buffer (FIG. 1, 125) in a stream prefetch cache mode as a stream prefetch cache. During data acquisition, a stream of memory accesses may exist that are anticipated to be accessed by the processing core (205). The stream prefetch cache may therefore prefetch multiple memory addresses that are likely to be used based on repetitiveness of these memory accesses. The buffer (FIG. 1, 125) being used as a stream prefetch cache may therefore predict which data may be accessed for future processes by the L1 cache (210).

In still another example, the L1 cache (210) may use the buffer (FIG. 1, 125) in an optimization buffer mode as an optimization buffer. The optimization buffer may be used as a way to store certain additional amounts of speculative data (i.e., prediction) such as branch history tables or undo/redo log for systems that have hardware transactional memory support. This additional information may be used to improve accuracy of predictions, such as branch predictions or improve hardware transactional memory performance by allowing more data to be involved in the transactions. Although this information may not be critical to operation of the memory hierarchy (200), it may serve to optimize speculative data accesses.

Each of these modes may be used during any idle period that the indexing accelerator (105) is experiencing. Therefore, in FIG. 2, the indexing accelerator (105) may at times operate solely as a victim cache, a miss buffer, a stream prefetch buffer, or an optimization buffer. In one example, there may be a number of indexing accelerators (105) communicatively coupled to the L1 cache (210) or the processing core (205). In this example, each indexing accelerator (105), during idle periods, may each be operating under a different mode as described above. Consequently, some or all of the types of modes may be operating on a number of indexing accelerators (105) and may act in concert to fulfill the functions of the various types of buffers described above. Additionally, any single indexing accelerator (105), during idle periods, may switch from one mode to another as directed by the processing core (205) or L1 cache (210).

After an operation mode has been selected (victim cache mode, miss buffer mode, stream buffer mode, or optimization buffer mode), the processing core (205) may disable the L1 cache (210) ways. During operation of an L1 cache (210) there may be a number of locations where data may be placed. When this happens and data is to be written to the L1 cache (210), if all of the ways are full, data is evicted from the cache. Using the buffer (FIG. 1, 125) as, for example, a victim cache will provide for a number of additional ways at which the L1 cache (210) can place any evicted data. Consequently, where the buffer (FIG. 1, 125), operating as a victim cache, is performing relatively well, there may not be a need to have all of the L1 cache (210) ways powered on. This may additionally reduce the amount of both dynamic and static power used during operations.

In an example, a number of indexing accelerators (105) may be placed between a number of caches in the memory hierarchy (200). In this example, therefore, FIG. 2 may further comprise an L3 cache with an indexing accelerator (105) communicatively coupling the L2 cache (220) with the L3 cache. Again, as described above, the second indexing accelerator (105) may provide for an additional buffer (FIG. 1, 125) which may be operating under the same or a different mode than the indexing accelerator (105) placed higher in the memory hierarchy (200).

In another example, the indexing accelerator (105) may take the place of the L1 cache (210) and include a relatively larger buffer (FIG. 1, 125). In this example, the buffer (FIG. 1, 125) size may exceed 8 KB of data storage. As a result, instead of a controller within the L1 cache (210) taking over buffer operations, the indexing accelerator (105) itself may accomplish this task and cause the buffer (FIG. 1, 125) to operate under the different modes described above during idle periods.

In yet another example, the buffer (FIG. 1, 125) may be used as a scratch pad memory such that the indexing accelerator (105), during idle periods, may provide an interface to the processing core (205) to enable specific computations to be performed on the data maintained within the buffer (FIG. 1, 125). The computations allowed could be operations that are provided by the indexing hardware, such as comparisons or address calculations. This allows flexibility in the indexing accelerator (105) by providing other ways to reuse the indexing accelerator (105).

As described above, the indexing accelerator (105) may be used as a victim cache, a miss buffer, a stream buffer, or an optimization buffer during idle periods. However, the indexing accelerator (105) may be used as an indexing accelerator once again, and the processing core (205) may send a signal to the indexing accelerator (105) to perform these indexing operations. When this occurs, the data contained in the buffer (FIG. 1, 125) is invalidated. If the data was clean data, the data may be deleted, written over, or the addresses to the data may be deleted. If the data is "dirty" or altered, then that data is flushed to the caches (210, 220) within the memory hierarchy (200).

After the buffer data on the indexing accelerator (105) has been invalidated, the indexing accelerator's (105) controller may be re-enabled by the receipt of a signal from the processing core (205). If the L1 cache (210) ways had been disabled previously, those cache (210) ways may also be re-enabled.

Figure 3:
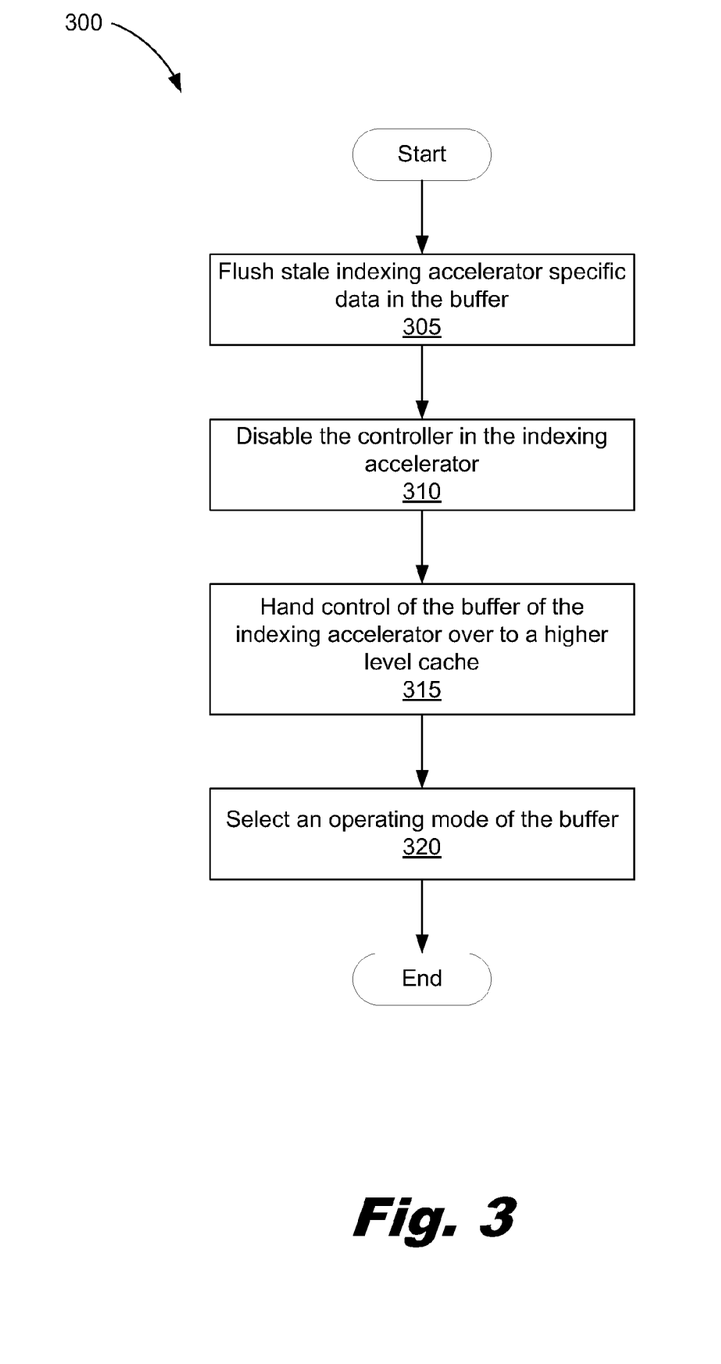
FIG. 3 is a flowchart showing a method of using a buffer within an indexing accelerator during periods of inactivity according to one example of principles described herein.

FIG. 3 is a flowchart showing a method (300) of using a buffer (FIG. 1, 125) within an indexing accelerator (FIG. 1, 105) during periods of inactivity according to one example of principles described herein. The method (300) may begin with flushing (305) any indexing specific data located in the buffer. As described above, the way in which this data is flushed (305) may depend on whether the data is dirty data or clean data.

The method may continue with the processing core (Fig, 2, 205) sending a signal to disable (310) the controller (FIG. 1, 115) within the indexing accelerator (FIG. 1, 105). This allows the buffer (FIG. 1, 125) within the indexing accelerator (FIG. 1, 105) to be made accessible to the memory hierarchy (200).

The control of the buffer (FIG. 1, 125) may then be handed over (315) to a higher level cache such as the L1 cache (FIG. 2, 210) described in connection with FIG. 2. Depending on current operations of the memory hierarchy (FIG. 2, 200), the processing core (FIG. 2, 205) then selects (320) an operating mode of the buffer (FIG. 1, 125): a victim cache mode, a miss buffer mode, a stream prefetch buffer mode, or an optimization buffer mode. The use of the buffer (FIG. 1, 125) in these modes may then continue until otherwise directed by the processing core (FIG. 2, 205). In one example, the mode of operation of the buffer (FIG. 1, 125) can be chosen at processor design time based on the applications expected to be run on the processing core (FIG. 2, 205) or may be based on the design of the processing core (FIG. 2, 205) itself. For example, a processing core (FIG. 2, 205) with a low associativity in the L1 cache (FIG. 2, 210) would likely benefit the greatest from the victim buffer mode. Conversely a processing core (FIG. 2, 205) frequently used for databases or other applications with a large instruction footprint may benefit most from the stream prefetcher mode.

Figure 4:
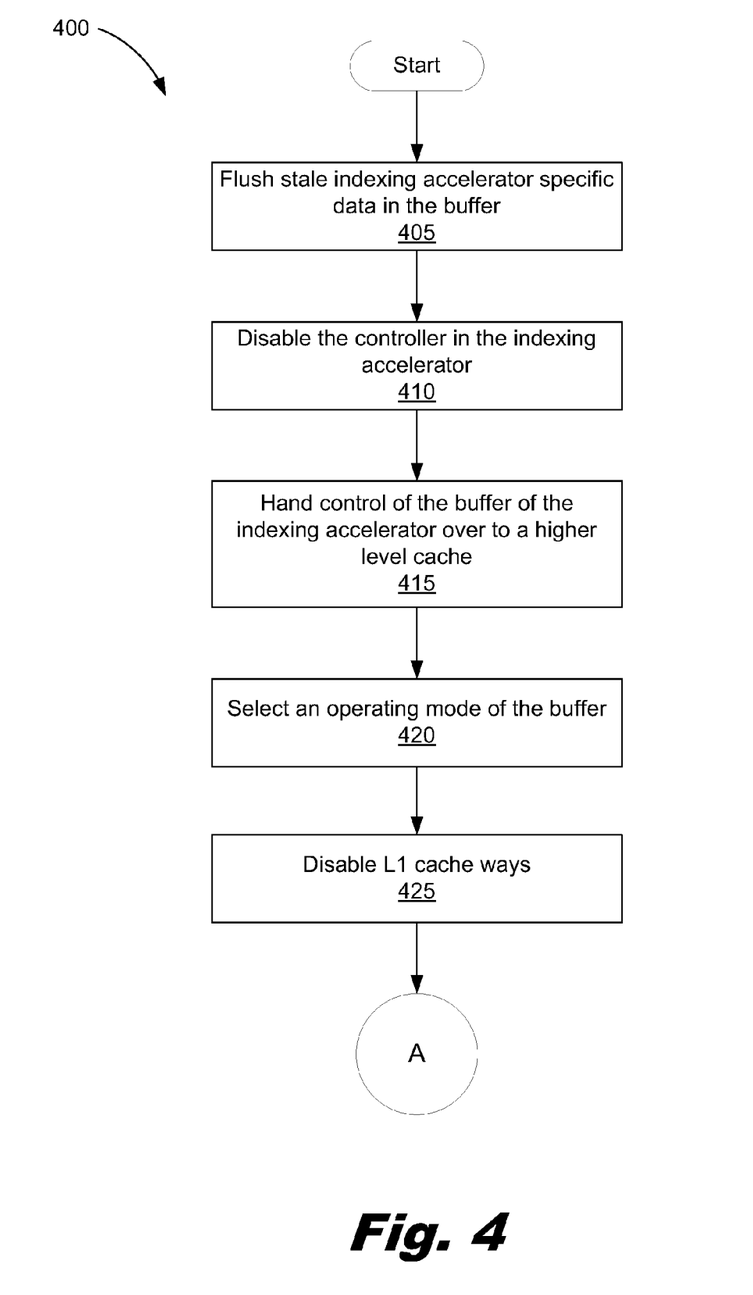
FIGS. 4 and 5 together are a flowchart showing a method of using a buffer within an indexing accelerator during periods of inactivity according to another example of principles described herein.
Figure 5:
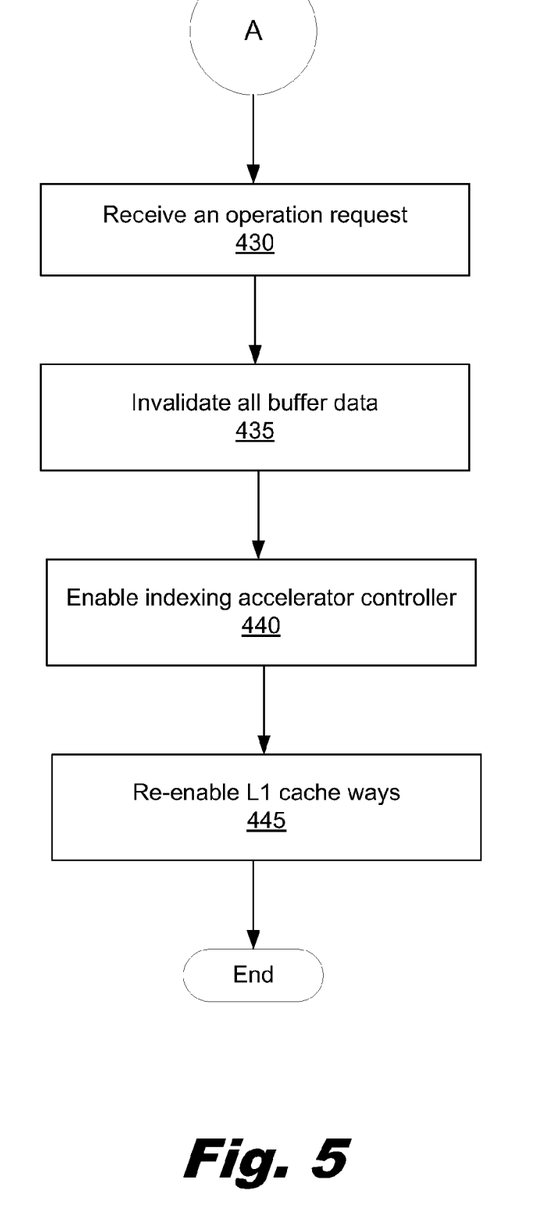

FIGS. 4 and 5 together are a flowchart showing a method (400) of using a buffer (FIG. 1, 125) within an indexing accelerator (FIG. 1, 105) during periods of inactivity according to another example of principles described herein. Similar to FIG. 3, the method (400) may begin with flushing (405) any indexing specific data located in the buffer (FIG. 1, 125). The processing core (Fig, 2, 205) then sends a signal to disable (410) the controller (FIG. 1, 115) within the indexing accelerator (FIG. 1, 105). Control of the buffer (FIG. 1, 125) within the indexing accelerator (FIG. 1, 105) may then be handed over (415) to a higher level cache such as the L1 cache (FIG. 2, 210) described in connection with FIG. 2. The processing core (FIG. 2, 205) then selects (420) an operating mode of the buffer (FIG. 1, 125): a victim cache mode, a miss buffer mode, a stream prefetch buffer mode, or an optimization buffer mode.

In addition, the L1 cache (FIG. 2, 210) ways may be disabled (425) as described above. Because disabling (425) the L1 cache (FIG. 2, 210) ways may result in some altered data being flushed to lower cache levels (i.e., 220), in one example the user may be given the ability to specify when the indexing accelerator (FIG. 1, 105) is unused (i.e., when the database is not in use). This may prevent a situation where the processing cost of flushing the altered data outweighs the length of time the indexing accelerator (FIG. 1, 105) is expected to be idle. Alternatively, the usage pattern history of the indexing accelerator (FIG. 1, 105) may be used to predict when the indexing accelerator (FIG. 1, 105) will be used for indexing and automatically determine whether or not it is worth the processing time and power to convert the indexing accelerator (FIG. 1, 105) into one of the modes described above.

The buffer (FIG. 1, 125) may be allowed to operate in one of the modes as described above until it receives (430) a request from the processing core (FIG. 2, 205) to begin operating once again as an indexing accelerator (FIG. 1, 105). As a result, all data within the buffer (FIG. 1, 125) is invalidated (435), the controller (FIG. 1, 115) within the indexing accelerator (FIG. 1, 105) is re-enabled (440), and the L1 cache (FIG. 2, 210) ways are re-enabled (445). In one example, the buffer (FIG. 1, 125) may be restricted to hold read-only data (e.g., shared data, instructions) while engaged in either the victim or stream buffer modes. Because this data is clean data, this may avoid any snooping operations to be initiated by the L2 cache (FIG. 2, 220) as described above. In this example, the indexing accelerator's (FIG. 1, 105) data can be dropped prior to the indexing accelerator (FIG. 1, 105) being reused for indexing. As a consequence this may allow very low latency between buffer reuse and indexing.

The method described in FIGS. 4 and 5 show how, during idle periods, an indexing accelerator (FIG. 1, 105) is disabled, the buffer (FIG. 1, 125) is used in one of the various modes described above, and is re-enabled as a indexing accelerator (FIG. 1, 105) when operations to index data are requested.

Figure 6:
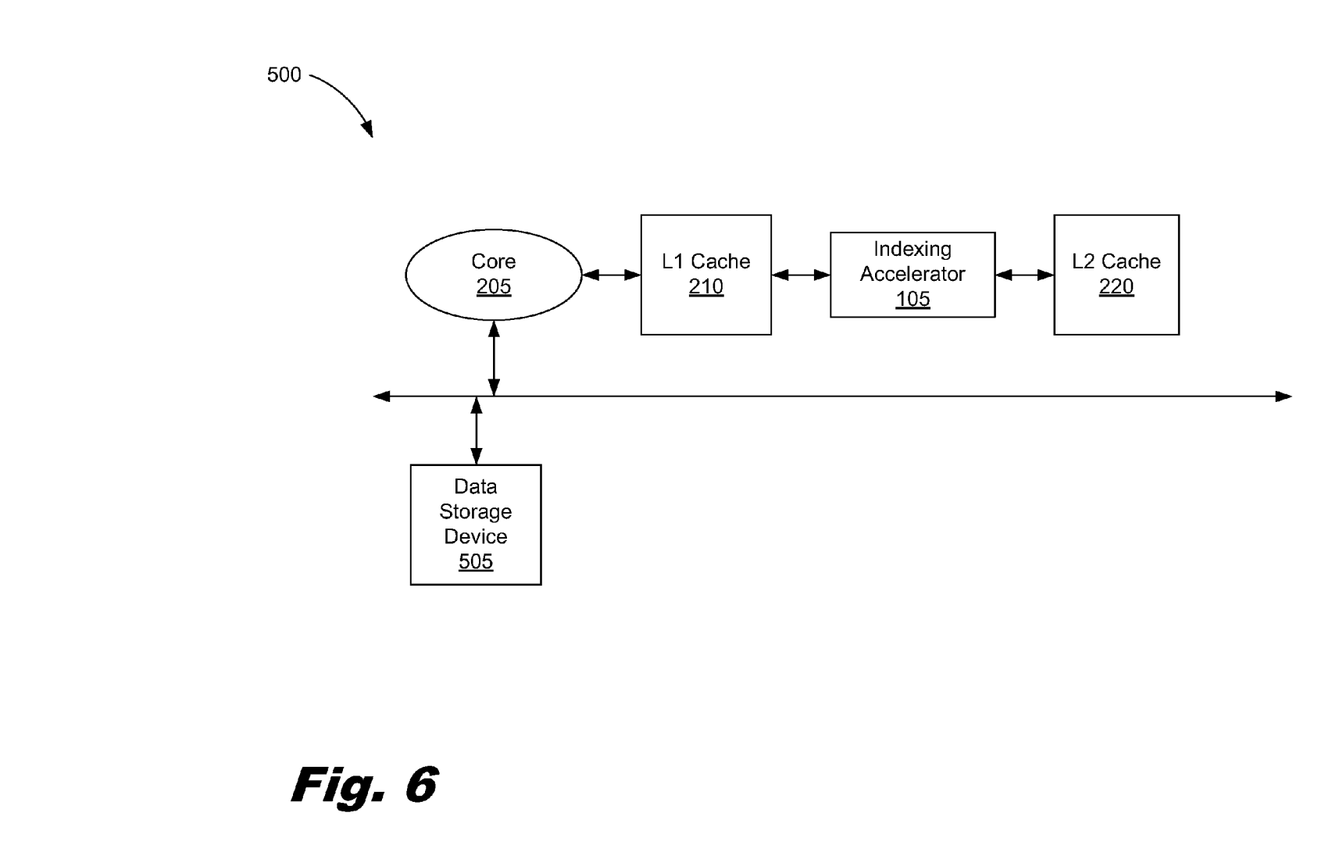
FIG. 6 is a block diagram of a system for using a buffer within an indexing accelerator during periods of inactivity if the indexing accelerator according to one example of the principles described herein.

FIG. 6 is a block diagram of a system (500) for using a buffer (FIG. 1, 125) within an indexing accelerator (FIG. 1, 105) during periods of inactivity if the indexing accelerator (FIG. 1, 105) according to one example of the principles described herein. The processing core (205) may be communicatively coupled to a data storage device (505) that stores data such as executable program code and that is executed by processing core (FIG. 2, 205) or other processing device in order to accomplished the methods described above. This data storage device (505) may include various types of memory modules, including volatile and nonvolatile memory. For example, the data storage device (505) of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processing core (FIG. 2, 205) may boot from Read Only Memory (ROM), maintain nonvolatile storage in the Hard Disk Drive (HDD) memory, and execute program code stored in Random Access Memory (RAM).

Generally, the data storage device (505) may comprise a computer readable storage medium. For example, the data storage device (505) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

Therefore, the present system and method may further include a computer program product comprising the computer readable storage medium described above. The computer readable storage medium may comprise computer usable program code that, when executed by the processing core (FIG. 2, 205), may complete the methods described above. Specifically, the computer readable storage medium comprises computer usable program code to, when executed by the processing core (FIG. 2, 205), flushes (305, 405) any indexing specific data located in the buffer (FIG. 1, 125) of the indexing accelerator (FIG. 1, 105). Further, the computer usable program code may, when executed by the processing core (FIG. 2, 205), disable (310, 410) the controller (FIG. 1, 115) within the indexing accelerator (FIG. 1, 105). Even further, the computer usable program code may, when executed by the processing core (FIG. 2, 205), cause the buffer (FIG. 1, 125) within the indexing accelerator (FIG. 1, 105) to be handed over (315, 415) to a higher level cache such as the L1 cache (FIG. 2, 210). Still further, the computer usable program code may, when executed by the processing core (FIG. 2, 205), select (320, 420) an operating mode of the buffer (FIG. 1, 125): i.e., either a victim cache mode, a miss buffer mode, a stream prefetch buffer mode, or an optimization buffer mode.

The computer usable program code may further, when executed by the processing core (FIG. 2, 205), disable (425) the L1 cache (FIG. 2, 210) ways of the L1 cache (FIG. 2, 210). After some time period, the computer usable program, when executed by the processing core (FIG. 2, 205), may direct that a request from the processing core (FIG. 2, 205) be sent (430) to instruct the indexing accelerator (FIG. 1, 105) to begin operating once again as an indexing accelerator (FIG. 1, 105). The computer usable program code may, when executed by the processing core (FIG. 2, 205), cause all data within the buffer (FIG. 1, 125) to be invalidated (435), the controller (FIG. 1, 115) within the indexing accelerator (FIG. 1, 105) to be re-enabled (440), and the L1 cache (FIG. 2, 210) ways also to be re-enabled (445).

The specification and figures describe a method of using a buffer within an indexing accelerator during periods of inactivity. The method improves the performance and energy efficiency of a system running the indexing accelerator by reducing the average memory access cycles. In the victim buffer mode, the use of the buffer in the indexing accelerator may more quickly find pages that were recently evicted without having to go to the next level of cache to find them. In the miss buffer mode, the use of the buffer in the indexing accelerator may prevent data with low reuse from polluting the cache and, as a result, will improve cache performance. Still further, in the stream prefetch mode, the use of the buffer in the indexing accelerator may help bring in data before it is needed by the processing core thereby allowing the processing core to avoid relatively lengthy stalls while waiting for data. Even further, during modes where the higher level cache ways are disabled, the use of the buffer is able to improve energy efficiency of the entire system by reducing the dynamic and static power of those cache ways.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of using a buffer within an indexing accelerator during periods of inactivity, comprising:
   flushing indexing specific data located in the buffer;
   disabling a controller within the indexing accelerator;
   handing control of the buffer over to a higher level cache; and
   selecting one of a number of operation modes of the buffer.

2. The method of claim 1, in which the operation modes comprise:
   a victim cache mode;
   a miss buffer mode;
   a stream buffer mode; or
   an optimization buffer mode.

3. The method of claim 1, further comprising receiving an operation request from a processing core to re-enable indexing operations on the indexing accelerator.

4. The method of claim 3, further comprising:
   invalidating all buffer data within the buffer; and
   re-enabling the controller within the indexing accelerator.

5. The method of claim 4, further comprising:
   disabling a number of cache ways within the higher level cache after selecting one of a number of operation modes of the buffer; and
   re-enabling the number of cache ways within the higher level cache after re-enabling the controller within the indexing accelerator.

6. The method of claim 1, in which the operation modes comprises using the buffer as a scratch pad memory.

7. An indexing accelerator, comprising:
   a controller; and
   a buffer communicatively coupled to the controller;
   in which, during periods of inactivity, the controller is disabled and a buffer operating mode among a number of operating modes is chosen under which the buffer will be used.

8. The indexing accelerator of claim 7, in which the operation modes comprise:
   a victim cache mode;
   a miss buffer mode;
   a stream buffer mode; or
   an optimization buffer mode.

9. The indexing accelerator of claim 7, in which indexing specific data located in the buffer is flushed prior to the controller being disabled.

10. The indexing accelerator of claim 7, in which control of the buffer is handed over to a higher level cache for use by that cache under one of the number of operation modes.

11. The indexing accelerator of claim 7, in which operation of the indexing accelerator as an indexing accelerator is accomplished by:
    receiving an operation request from a processing core to re-enable indexing operations on the indexing accelerator;
    invalidating all buffer data within the buffer; and
    re-enabling the controller within the indexing accelerator.

12. The indexing accelerator of claim 11, in which:
    a number of cache ways within the higher level cache are disabled after choosing one of a number of operation modes of the buffer; and
    the number of cache ways within the higher level cache are re-enabled after re-enabling the controller within the indexing accelerator.

13. A computer program product for using a buffer within an indexing accelerator during periods of inactivity, the computer program product comprising:
    a computer readable storage medium comprising computer usable program code embodied therewith to, when executed by a processor:
    flush indexing specific data located in the buffer;
    disable a controller within the indexing accelerator;
    hand over control of the buffer to a higher level cache; and,
    select one of a number of operation modes of the buffer.

14. The computer program product of claim 13, in which the operation modes comprise:
    a victim cache mode;

a miss buffer mode;
a stream buffer mode; or
an optimization buffer mode.

15. The computer program product of claim 13, further comprising computer usable program code to, when executed by a processor:
receive an operation request from a processing core to re-enable indexing operations on the indexing accelerator;
invalidate all buffer data within the buffer; and
re-enable the controller within the indexing accelerator.

\* \* \* \* \*